(12) United States Patent
Harrison et al.

(10) Patent No.: US 10,974,808 B2
(45) Date of Patent: Apr. 13, 2021

(54) AIRCRAFT WITH STRUT-BRACED WING SYSTEM

(71) Applicant: The Boeing Company, Chicago, IL (US)

(72) Inventors: Neal A. Harrison, Lake Forest, CA (US); Lie-Mine Gea, Irvine, CA (US); Anthony J. Sclafani, Alta Loma, CA (US); Eric D. Dickey, Long Beach, CA (US); Michael D. Beyar, Long Beach, CA (US); Christopher K. Droney, Long Beach, CA (US)

(73) Assignee: The Boeing Company, Chicago, IL (US)

( * ) Notice: Subject to any disclaimer, the term of this patent is extended or adjusted under 35 U.S.C. 154(b) by 453 days.

(21) Appl. No.: 15/928,429

(22) Filed: Mar. 22, 2018

(65) Prior Publication Data

US 2019/0291846 A1    Sep. 26, 2019

(51) Int. Cl.
| | |
|---|---|
| *B64C 3/50* | (2006.01) |
| *B64C 1/26* | (2006.01) |
| *B64C 9/18* | (2006.01) |
| *B64C 9/24* | (2006.01) |
| *B64C 39/08* | (2006.01) |

(Continued)

(52) U.S. Cl.
CPC .................. *B64C 3/50* (2013.01); *B64C 1/26* (2013.01); *B64C 9/18* (2013.01); *B64C 9/24* (2013.01); *B64C 23/04* (2013.01); *B64C 39/068* (2013.01); *B64C 39/08* (2013.01); *B64C 9/34* (2013.01)

(58) Field of Classification Search
CPC .... B64C 1/26; B64C 3/50; B64C 7/00; B64C 9/28; B64C 39/068
See application file for complete search history.

(56) References Cited

U.S. PATENT DOCUMENTS

| | | | |
|---|---|---|---|
| 1,995,090 A | 3/1935 | Bellanca | |
| 2,643,076 A | 6/1953 | Louis | |

(Continued)

FOREIGN PATENT DOCUMENTS

WO    2015150818    8/2015

OTHER PUBLICATIONS

Norris, "Truss-Braced Wings May Find Place on Transonic Aircraft," Aviation Week & Space Technology, Mar. 25, 2016, accessed from http://www.w54.biz/showthread.php?3304-Truss-Braced-Wings-May-Find-Place-On-Transonic-Aircraft on Mar. 23, 2017.

(Continued)

*Primary Examiner* — Nicholas McFall
(74) *Attorney, Agent, or Firm* — Kunzler Bean & Adamson

(57) ABSTRACT

Described herein is an aircraft. The aircraft comprises a body. The aircraft also comprises a wing coupled to and extending from the body. The wing comprises a wing inboard end portion, a wing outboard end portion, opposite the wing inboard end portion, and an intermediate portion between the wing inboard end portion and the wing outboard end portion. The aircraft further comprises a strut. The strut comprises a strut inboard end portion coupled to and extending from the body and a strut outboard end portion coupled to and extending from the intermediate portion of the wing. The aircraft additionally comprises at least one aerodynamic control surface movably coupled to the strut.

20 Claims, 6 Drawing Sheets

(51) Int. Cl.
 *B64C 39/06* (2006.01)
 *B64C 23/04* (2006.01)
 *B64C 9/34* (2006.01)

(56) References Cited

U.S. PATENT DOCUMENTS

| | | | |
|---|---|---|---|
| 4,235,400 A * | 11/1980 | Haworth | B64C 3/38 |
| | | | 244/218 |
| 6,340,134 B1 | 1/2002 | Meschino | |
| 8,141,815 B1 * | 3/2012 | Hoisington | B64C 39/068 |
| | | | 244/37 |
| 9,415,856 B2 | 8/2016 | Rawdon et al. | |
| 9,481,450 B2 | 11/2016 | Pitt et al. | |
| 9,598,176 B2 | 3/2017 | Giamati et al. | |
| 10,040,559 B2 | 8/2018 | Hoisington | |
| 10,279,891 B2 | 5/2019 | Krebs | |
| 2013/0020433 A1 | 1/2013 | Hoisington | |
| 2017/0113779 A1 | 4/2017 | Wright | |
| 2018/0281922 A1 | 10/2018 | Sclafani et al. | |
| 2018/0281926 A1 | 10/2018 | Sclafani et al. | |

OTHER PUBLICATIONS

Ko et al., Transonic Aerodynamics of a Wing/Pylon/Strut Juncture, AIAA, 2003, pp. 1-10.
Ko et al., A-7 Strut Braced Sing Concept Transonic Wing Design, NASA Jul. 12, 2002, pp. 1-150.

* cited by examiner

US 10,974,808 B2

AIRCRAFT WITH STRUT-BRACED WING SYSTEM

GOVERNMENT LICENSE RIGHTS

The invention described herein was made in the performance of work under NASA Contract No. NNL16AA04B-NNL17AA46T and is subject to the provisions of Section 305 of the National Aeronautics and Space Act of 1958 (72 Stat.435: 42U.S.C.2457). The Government has certain rights in this invention.

FIELD

This disclosure relates generally to mobile vehicles, and more particularly to aircraft with wings braced by struts.

BACKGROUND

Some aircraft employ struts or trusses to brace and stiffen wings. Such struts create a channel between the struts and the wings. Under certain operating conditions, shockwaves can form within the channel between the struts and wings. At transonic speeds, shockwaves generally cause an increase in the interference drag acting on the wings and struts. Higher interference drag can lead to a lower flight efficiency of an aircraft. Additionally, shockwaves within the channel between the struts and wings may cause buffeting of the wings and/or struts. Reducing interference drag and buffeting conditions, by reducing the occurrence and/or intensity of shockwaves within the channel between the struts and wings can be difficult.

SUMMARY

The subject matter of the present application has been developed in response to the present state of the art, and in particular, in response to the problems and disadvantages associated with the strut-braced wing systems of conventional aircraft operating at transonic speeds, that have not yet been fully solved by currently available techniques. Accordingly, the subject matter of the present application has been developed to provide an aircraft with a strut-braced wing system that overcomes at least some of the above-discussed shortcomings of prior art techniques.

Described herein is an aircraft. The aircraft comprises a body. The aircraft also comprises a wing coupled to and extending from the body. The wing comprises a wing inboard end portion, a wing outboard end portion, opposite the wing inboard end portion, and an intermediate portion between the wing inboard end portion and the wing outboard end portion. The aircraft further comprises a strut. The strut comprises a strut inboard end portion coupled to and extending from the body and a strut outboard end portion coupled to and extending from the intermediate portion of the wing. The aircraft additionally comprises at least one aerodynamic control surface movably coupled to the strut. The preceding subject matter of this paragraph characterizes example 1 of the present disclosure.

The at least one aerodynamic control surface is selectively movable relative to the strut to adjust a distance between the at least one aerodynamic control surface and the wing. The preceding subject matter of this paragraph characterizes example 2 of the present disclosure, wherein example 2 also includes the subject matter according to example 1, above.

The at least one aerodynamic control surface is selectively movable toward the wing to decrease the distance between the at least one aerodynamic control surface and the wing. The preceding subject matter of this paragraph characterizes example 3 of the present disclosure, wherein example 3 also includes the subject matter according to example 2, above.

The at least one aerodynamic control surface is selectively movable away from the wing to increase the distance between the at least one aerodynamic control surface and the wing. The preceding subject matter of this paragraph characterizes example 4 of the present disclosure, wherein example 4 also includes the subject matter according to any one of examples 2-3, above.

The strut comprises a trailing edge. The at least one aerodynamic control surface is coupled to the trailing edge of the strut. The preceding subject matter of this paragraph characterizes example 5 of the present disclosure, wherein example 5 also includes the subject matter according to any one of examples 1-4, above.

The strut comprises a leading edge. The at least one aerodynamic control surface is coupled to the leading edge of the strut. The preceding subject matter of this paragraph characterizes example 6 of the present disclosure, wherein example 6 also includes the subject matter according to any one of examples 1-5, above.

The strut comprises a leading edge and a trailing edge. The aircraft comprises a plurality of aerodynamic control surfaces. The preceding subject matter of this paragraph characterizes example 7 of the present disclosure, wherein example 7 also includes the subject matter according to any one of examples 1-6, above.

At least one of the plurality of aerodynamic control surfaces is movably coupled to the leading edge of the strut. At least one of the plurality of aerodynamic control surfaces is movably coupled to the trailing edge of the strut. The preceding subject matter of this paragraph characterizes example 8 of the present disclosure, wherein example 8 also includes the subject matter according to example 7, above.

At least one of the plurality of aerodynamic control surfaces is movably coupled to the strut inboard end portion of the strut. At least one of the plurality of aerodynamic control surfaces is movably coupled to the strut outboard end portion of the strut. The preceding subject matter of this paragraph characterizes example 9 of the present disclosure, wherein example 9 also includes the subject matter according to any one of examples 7-8, above.

The at least one aerodynamic control surface is movably coupled to the strut outboard end portion of the strut. The preceding subject matter of this paragraph characterizes example 10 of the present disclosure, wherein example 10 also includes the subject matter according to any one of examples 1-9, above.

The at least one aerodynamic control surface is movably coupled to the strut inboard end portion of the strut. The preceding subject matter of this paragraph characterizes example 11 of the present disclosure, wherein example 11 also includes the subject matter according to any one of examples 1-10, above.

The at least one aerodynamic control surface comprises a flap hingedly coupled to the strut. The preceding subject matter of this paragraph characterizes example 12 of the present disclosure, wherein example 12 also includes the subject matter according to any one of examples 1-11, above.

The strut comprises a leading edge and a trailing edge. The at least one aerodynamic control surface comprises a leading edge and a trailing edge. The at least one aerodynamic control surface is movable between a retracted position and an extended position. In the retracted position the trailing edge of the at least one aerodynamic control surface is aligned with the trailing edge of the strut. In the extended position the trailing edge of the at least one aerodynamic control surface is vertically offset from the trailing edge of the strut. The preceding subject matter of this paragraph characterizes example 13 of the present disclosure, wherein example 13 also includes the subject matter according to any one of examples 1-12, above.

The strut comprises a leading edge and a trailing edge. The at least one aerodynamic control surface comprises a leading edge and a trailing edge. The at least one aerodynamic control surface is movable between a retracted position and an extended position. In the retracted position the leading edge of the at least one aerodynamic control surface is aligned with the leading edge of the strut. In the extended position the leading edge of the at least one aerodynamic control surface is vertically offset from the leading edge of the strut. The preceding subject matter of this paragraph characterizes example 14 of the present disclosure, wherein example 14 also includes the subject matter according to any one of examples 1-13, above.

The at least one aerodynamic control surface is movable between a retracted position and an extended position. In the retracted position the at least one aerodynamic control surface is flush with the strut. In the extended position the at least one aerodynamic control surface is not flush with the strut. The preceding subject matter of this paragraph characterizes example 15 of the present disclosure, wherein example 15 also includes the subject matter according to any one of examples 1-14, above.

The wing has a span-to-chord ratio of at least 18:1. The preceding subject matter of this paragraph characterizes example 16 of the present disclosure, wherein example 16 also includes the subject matter according to any one of examples 1-15, above.

The aircraft is configured for travel at transonic speeds. The preceding subject matter of this paragraph characterizes example 17 of the present disclosure, wherein example 17 also includes the subject matter according to any one of examples 1-16, above.

Further described herein is an aircraft. The aircraft comprises a body. The aircraft also comprises a wing, coupled to and extending from the body. The wing comprises a wing inboard end portion, a wing outboard end portion, opposite the wing inboard end portion, and an intermediate portion between the wing inboard end portion and the wing outboard end portion. The aircraft further comprises a strut. The strut comprises a strut inboard end portion coupled to and extending from the body and a strut outboard end portion coupled to and extending from the intermediate portion of the wing. The aircraft additionally comprises a first aerodynamic control surface movably coupled to the strut at the strut outboard end portion. The aircraft also comprises a second aerodynamic control surface movably coupled to the strut at the strut inboard end portion. The aircraft further comprises a controller configured to selectively control movement of the first aerodynamic control surface and the second aerodynamic control surface relative to the strut. The preceding subject matter of this paragraph characterizes example 18 of the present disclosure.

At transonic speeds of the aircraft the controller is configured to move the first aerodynamic control surface toward the wing and to maintain the second aerodynamic control surface in a retracted position. The preceding subject matter of this paragraph characterizes example 19 of the present disclosure, wherein example 19 also includes the subject matter according to example 18, above.

At landing and take-off speeds of the aircraft the controller is configured to maintain the first aerodynamic control surface in a retracted position and to move the second aerodynamic control surface toward or away from the wing. The preceding subject matter of this paragraph characterizes example 20 of the present disclosure, wherein example 20 also includes the subject matter according to any one of examples 18-19, above.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Figure 1:
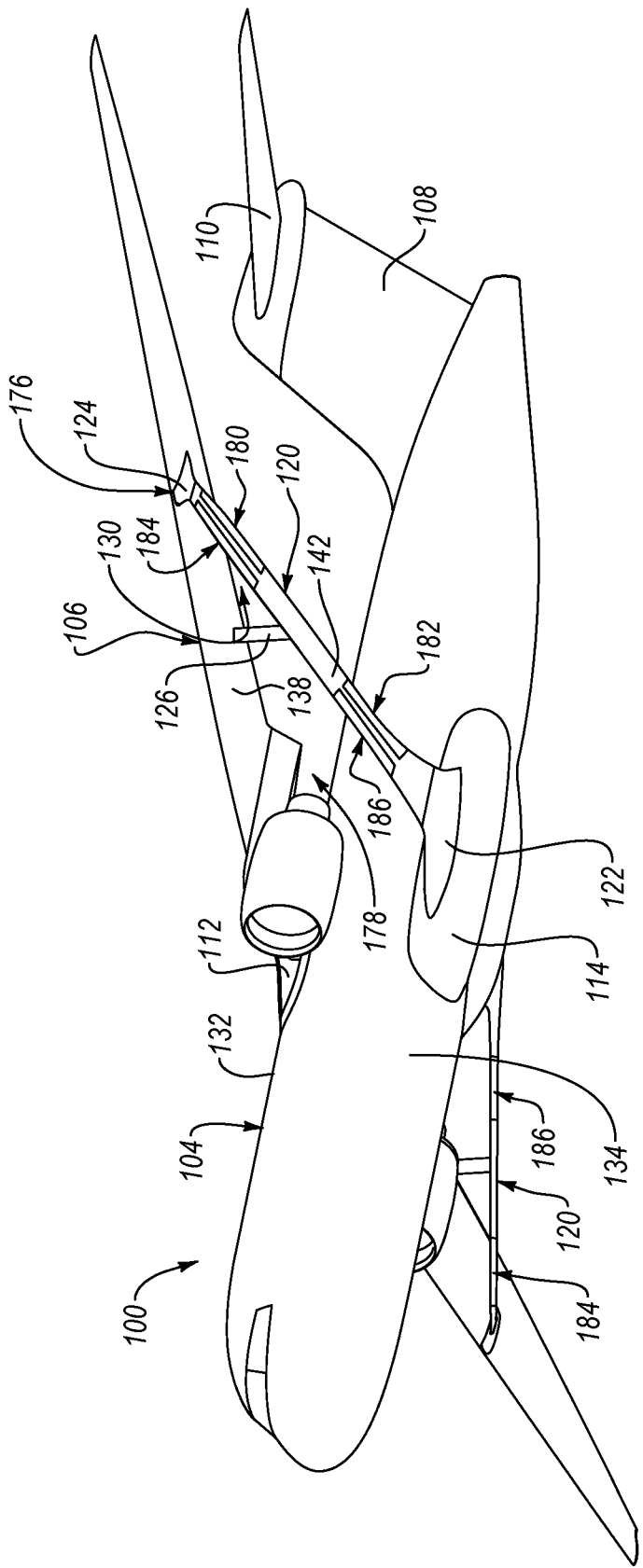
FIG. 1 is a perspective view of an aircraft, according to one or more examples of the present disclosure.

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

The present disclosure provides an aircraft with a high aspect ratio wing braced by a strut. In some implementations, the aircraft is designed to travel at transonic speeds (e.g., free stream Mach number between about 0.7 and about 0.9) and support the commercial or military transportation of mass loads and/or mass passengers. In some implementations, the strut includes one or more aerodynamic control surfaces that are adjustable to reduce the strength of shockwaves around the wing and strut (e.g., between the wing and strut) that may occur near the intersection of the wing and strut at transonic speeds. Additionally, the one or more aerodynamic control surfaces can be adjustable to redistribute the loading between the wing and the strut, which can reduce drag at transonic conditions. It is noted that for an aircraft traveling at transonic speeds, air flow over some of the surfaces of the aircraft (e.g., around leading edges and between the wing and strut) can reach sonic speeds (e.g., local Mach number of 1.0 or greater). In the same, or alternative, implementations, the strut includes one or more aerodynamic control surfaces that are adjustable to control the lift or drag generated by the strut at non-cruising speeds (e.g., landing and take-off speeds).

Referring to FIGS. 1-4, one embodiment of an aircraft 100 is shown. The aircraft 100 includes a body 104 (e.g., fuselage), a pair of wings 106 coupled to and extending from the body 104, a vertical stabilizer 108 coupled to and extending from the body 104, and a pair of horizontal stabilizers 110 coupled to and extending from the vertical stabilizer 108, or directly from the body 104 in some implementations. The aircraft 100 includes features representative of a commercial passenger, commercial transport, or military transport aircraft. The aircraft 100 also includes a pair of engines 102 operable to propel the aircraft 100 up to at least transonic speeds in some implementations. Accordingly, the features of the aircraft 100, including the body 104 and the wings 106 are configured to promote travel at transonic speeds. The engines 102 are attached to the wings 106, respectively, in the illustrated embodiment. However, in other embodiments, the engines 102 can be attached to other parts of the aircraft 100, such as the vertical stabilizer 108.

The wings 106 have a top surface 136 and a bottom surface 138, opposite the top surface 136. The top surface 136 and the bottom surface 138 define external surfaces of the wings 106. Each wing 106 is attached to the body 104 at a top portion 132 of the body 104 via a wing fairing 112. The wing fairing 112 is coupled to the top portion 132 of the body 104 and facilitates a secure attachment of the wings 106 to the body 104 with no adverse effects on the local flow field. Each wing 106 has a relatively high span-to-chord aspect ratio compared to general aviation aircraft. For example, in one implementation, each wing 106 has a span-to-chord aspect ratio greater than 10:1, and in another implementation, each wing 106 has a span-to-chord aspect ratio equal to or greater than 18:1. In yet certain examples, each wing 106 has an aspect ratio that is at least 19:1, such as 19.5:1.

Figure 4:
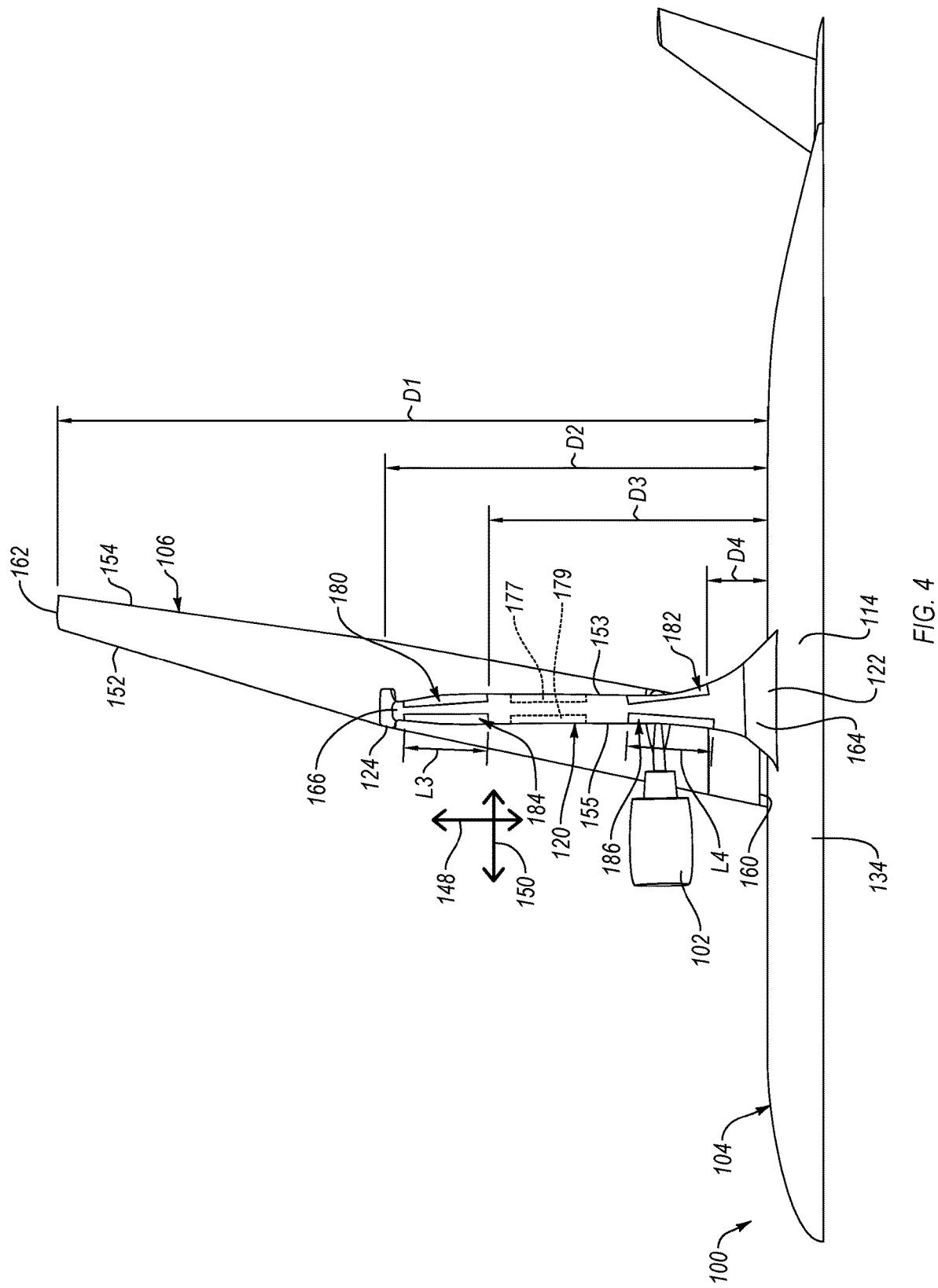
FIG. 4 is a bottom view of a port half of the aircraft of FIG. 1, according to one or more examples of the present disclosure.

Generally, as shown in FIG. 4, each wing 106 extends away from the wing fairing 112 in a spanwise direction 148 from a wing inboard end portion 160 of the wing 106 to a wing outboard end portion 162 of the wing 106, which includes a tip of the wing 106. The wing inboard end portion 160 is a fixed end portion and the wing outboard end portion 162 is a free end portion. Additionally, as also shown in FIG. 4 and into the page in FIG. 2, the chord of each wing 106, at a given location along the span of the wing 106, extends in a chordwise direction 150. Unless otherwise noted, as used herein, a direction identified in the figures by dual directional arrows effectively includes both directions or opposite directions along the identified path. Accordingly, for example, the spanwise direction 148 includes a body-to-wingtip direction along the path identified with dual directional arrows and labeled 148 and a wingtip-to-body direction along the same path.

Because of the high span-to-chord aspect ratio of the wings 106 and high loads placed on the wings 106, such as at transonic speeds, the wings 106 of the aircraft 100 form part of a strut-braced wing system of the aircraft 100, which includes a pair of struts 120 to brace the wings 106. Generally, the struts 120 are configured to act as a stiffening member to promote stiffening of the wings. Furthermore, the struts 120 help to transfer buckling loads away from the wing 106. Although in the illustrated embodiment, one strut 120 is associated with each wing 106, in other embodiments, additional struts, such as one or more jury struts 126, spanning the channel 178 between a wing 106 and a strut 120, can be associated with each wing 106.

The struts 120 have a top surface 140 and a bottom surface 142, opposite the top surface 140. The top surface 140 and the bottom surface 142 define external surfaces of the struts 120. Each strut 120 is attached to the body 104 at a bottom portion 134 of the body 104 via a body-strut fairing 122. Each body-strut fairing 122 facilitates a secure attachment of a respective one of the struts 120 to a landing gear fairing 114. The landing gear fairing 114 is coupled to the bottom portion 134 of the body 104 and is configured to house the landing gear of the aircraft 100. Each strut 120 has a relatively high span-to-chord aspect ratio.

Generally, as shown in FIG. 4, each strut 120 extends away from the body-strut fairing 122 in the spanwise direction 148 from a strut inboard end portion 164 to a strut outboard end portion 166. The strut inboard end portion 164 is a fixed end portion and the strut outboard end portion 166 also is a fixed end portion. The strut outboard end portion 166 is attached to a wing-strut fairing 124 that is coupled to the bottom surface 138 of the wing 106 at an intermediate portion 176 of the wing 106. Accordingly, each strut 120 is coupled to the intermediate portion 176 of a wing 106 via a respective wing-strut fairing 124. The intermediate portion 176 of each wing 106 is located between the wing inboard end portion 160 and the wing outboard end portion 162. Additionally, as also shown in FIG. 4 and into the page in FIG. 2, the chord of each strut 120 at a given location along the span of the strut 120 extends in the chordwise direction 150.

Figure 2:
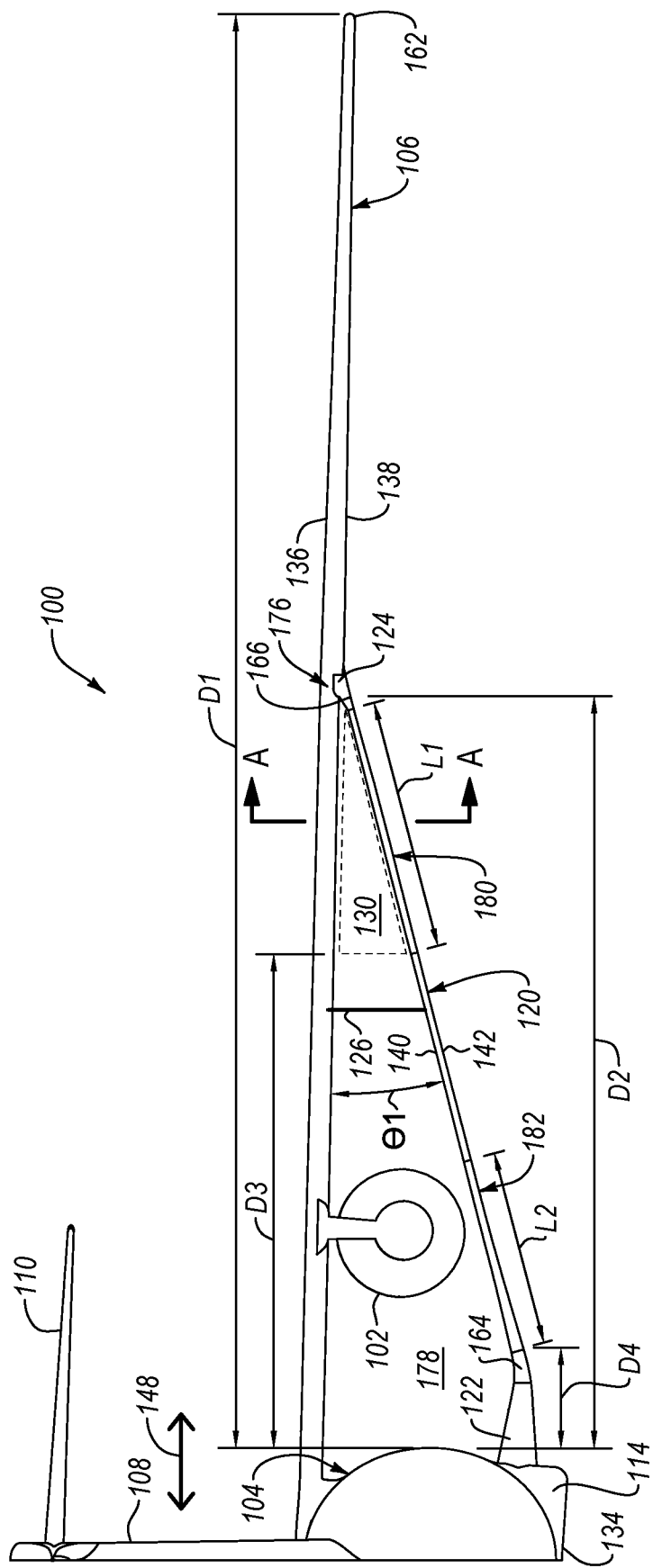
FIG. 2 is a rear view of a starboard half of the aircraft of FIG. 1, according to one or more examples of the present disclosure.
Figure 3:
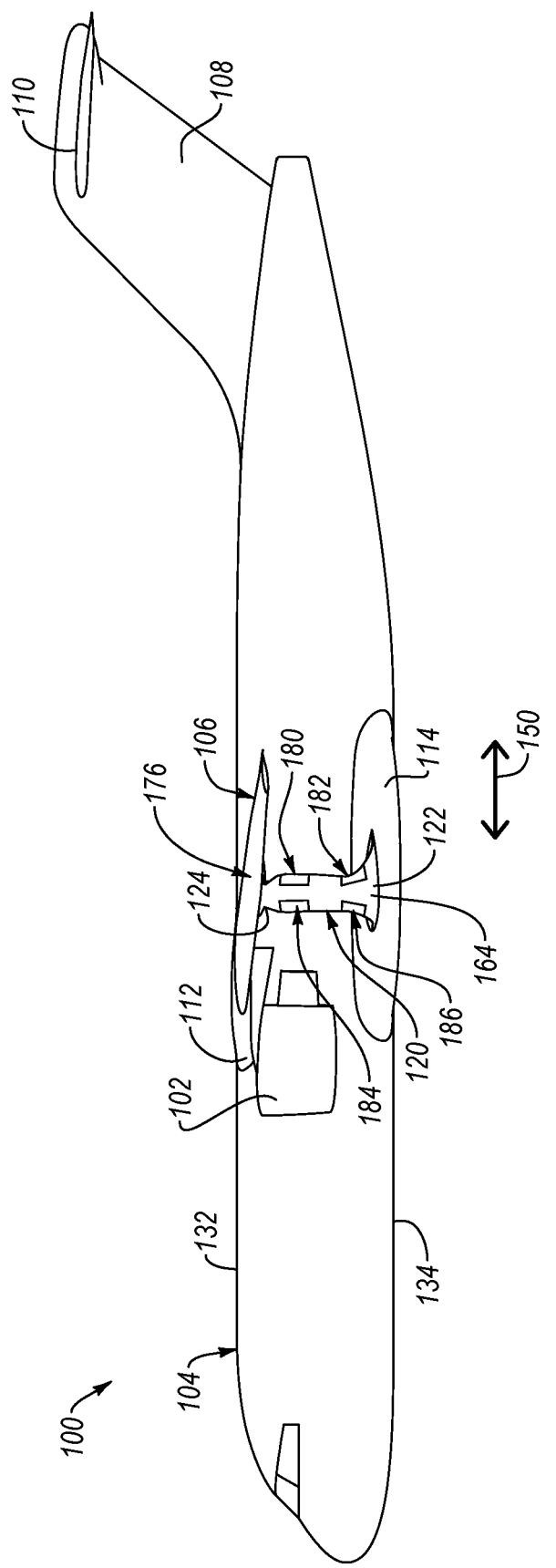
FIG. 3 is a side elevation view of the aircraft of FIG. 1, according to one or more examples of the present disclosure.

Referring now to FIG. 2, the strut 120 is angled upwardly at an angle θ1 relative to the wing 106. In other words, each strut 120 extends upwardly away from the bottom portion 134 of the body 104 at the angle θ1 relative to a respective one of the wings 106. In one implementation, the wings 106 extend away from the body 104 substantially along a horizontal plane with some amount of anhedral. However, in certain implementations, the wings 106 extend away from the body 104 with no anhedral or with some dihedral.

Referring to FIG. 4, each wing 106 extends to a first distance D1 away from the body 104 (e.g., away from a respective side of the body 104). Similarly, each strut 120 extends to a second distance D2 away from the body 104. Accordingly, the intermediate portion 176 of the wing 106 is located at the second distance D2 away from the body 104. In one embodiment, the second distance D2 is between about 40% and about 70% of the first distance D1. According to some implementations, the second distance D2 is between about 50% and about 60% of the first distance D1. In one particular implementation, the second distance D2 is about 58% of the first distance D1.

When viewed from a top or bottom view (see, e.g., FIG. 4), each wing 106 vertically overlaps a respective strut 120 such that a space or channel 178 is defined directly between the bottom surface 138 of the wing 106 and the top surface 140 of the strut 120. Referring to FIG. 2, air passes through the channels 178 between the wings 106 and the struts 120 when the aircraft 100 is in motion. At high speeds, such as transonic speeds, air can pass through the channels 178 between the wings 106 and the struts 120 at transonic speeds. Although the channel 178 effectively converges in the spanwise direction 148 away from the body 104, because of the relatively large distance between the wing bottom surface 138 and the strut top surface 140, air passing through the majority of each channel 178 is less inclined to accelerate beyond the transonic regime to reach Mach 1 or greater relative to the air passing around the channel 178. However, air passing through a wing-strut channel 130 of the channel 178 proximate the intersection of the wing 106 and the strut 120 (e.g., adjacent the intermediate portion 176 of the wing 106) is inclined to accelerate to Mach 1 or greater due to the relatively smaller distance between the wing bottom surface 138 and the strut top surface 140 in the wing-strut channel 130 and the increased interaction between these surfaces.

Substantial acceleration of air through the wing-strut channel 130, particularly when the aircraft 100 is traveling at transonic speeds, can cause a shockwave above the strut 120 and within the wing-strut channel 130. Shockwaves formed within the wing-strut channel 130 tend to increase interference drag on the associated wing 106 and strut 120. Additionally, shockwaves formed within the wing-strut channel 130 can produce buffeting conditions resulting in buffeting of the wing 106 and/or the strut 120. The wing-strut channel 130 initiates at a third distance D3 away from the body 104. Accordingly, the wing-strut channel 130 has a length equal to the difference between the second distance D2 and the third distance D3. In one implementation, the third distance D3 is greater than about 50% of the second distance D2. According to some implementations, the third distance D3 is between about 30% and about 60% (e.g., about 45%) of the first distance D1.

To promote a reduction in the strength of the shockwave generated within the wing-strut channel 130 and a corresponding reduction in the interference drag and buffeting conditions associated with the wing 106 and the strut 120, the aircraft 100 includes at least one aerodynamic control surface movably coupled to the strut 120 at the strut outboard end portion 166 of the strut 120. Generally, the aerodynamic control surface is selectively movable relative to the strut 120 to adjust a distance between the aerodynamic control surface and the wing 106. Adjusting the distance between the aerodynamic control surface and the wing 106 also adjusts the capture area of the wing-strut channel 130, which changes the amount, and thus speed, of air allowed to flow through the wing-strut channel 130. As presented above, because the formation of shockwaves and buffeting conditions is tied to the amount or speed of air passing through the wing-strut channel 130, selectively moving the aerodynamic control surface relative to the strut 120 also adjusts the strength of shockwaves and the occurrence of buffeting conditions at the wing-strut channel 130. In this manner, the aerodynamic control surface movably coupled to the strut facilitates an increase in the operability envelope of the aircraft 100.

In one embodiment, the at least one aerodynamic control surface movably coupled to each strut 120 at the strut outboard end portion 166 includes one or more of an outboard trailing aerodynamic control surface 180 and an outboard leading aerodynamic control surface 184. For example, in some implementations, the at least one aerodynamic control surface movably coupled to each strut 120 at the strut outboard end portion 166 includes only the outboard trailing aerodynamic control surface 180. In yet some implementations, the at least one aerodynamic control surface movably coupled to each strut 120 at the strut outboard end portion 166 includes both the outboard trailing aerodynamic control surface 180 and the outboard leading aerodynamic control surface 184.

The outboard trailing aerodynamic control surface 180 is movably coupled to the trailing edge 153 of the strut 120 at the strut outboard end portion 166 of the strut 120. The outboard trailing aerodynamic control surface 180 defines an aft part of the wing-strut channel 130. The portion of the trailing edge 153 of the strut 120, to which the outboard trailing aerodynamic control surface 180 is movably coupled, can be inset from other portions of the trailing edge 153 of the strut 120. For example, the trailing edge 153 of the strut 120 may include a notch or pocket within which the outboard trailing aerodynamic control surface 180 is located in a retracted position. The notch defines the trailing edge 153 of the strut 120 at the location of the notch.

Referring to FIGS. 2 and 4, in some implementations, the outboard trailing aerodynamic control surface 180 is located within the wing-strut channel 130 and extends from the third distance D3 towards the wing-strut fairing 124. In yet other implementations, the outboard trailing aerodynamic control surface 180 extends from a distance, less than or greater than the third distance D3, away from the body 104 towards the wing-strut fairing 124. Referring to FIG. 2, in some implementations, the outboard trailing aerodynamic control surface 180 has a first length L1, which can be equal to, greater than, or less than a length of the wing-strut channel 130.

In contrast to the outboard trailing aerodynamic control surface 180, the outboard leading aerodynamic control surface 184 is movably coupled to the leading edge 155 of the strut 120 at the strut outboard end portion 166 of the strut 120. The outboard leading aerodynamic control surface 184 defines a forward part of the wing-strut channel 130. The portion of the leading edge 155 of the strut 120, to which the outboard leading aerodynamic control surface 184 is movably coupled, can be inset from other portions of the leading edge 155 of the strut 120. For example, the leading edge 155 of the strut 120 may include a notch or pocket within which the outboard leading aerodynamic control surface 184 is located in a retracted position. The notch defines the leading edge 155 of the strut 120 at the location of the notch.

Referring to FIGS. 2 and 4, in some implementations, the outboard leading aerodynamic control surface 184 is located within the wing-strut channel 130 and extends from the third distance D3 towards the wing-strut fairing 124. In yet other implementations, the outboard leading aerodynamic control surface 184 extends from a distance, less than or greater than the third distance D3, away from the body 104 towards the wing-strut fairing 124. Generally, in certain implementations, the outboard trailing aerodynamic control surface 180 is opposite the outboard leading aerodynamic control surface 184 in a chordwise direction along the strut 120. Referring to FIG. 2, in some implementations, the outboard leading aerodynamic control surface 184 has a third length L3, which can be equal to, greater than, or less than a length of the wing-strut channel 130. The first length L1 of the outboard trailing aerodynamic control surface 180 can be the same as or different than the third length L3 of the outboard trailing aerodynamic control surface 184.

As described above, because the capture area of the channel 178, between the wing 106 and the strut 120, away from the wing-strut channel 130 is comparatively greater than at the wing-strut channel 130, the formation of interference drag-inducing shockwaves and buffeting away from the wing-strut channel 130 is less of a concern. Accordingly, aerodynamic control surfaces movably coupled to the strut 120 at locations away from the wing-strut channel 130, such as at the strut outboard end portion 154, may not have as significant an impact on the formation of shockwaves and buffeting as at the wing-strut channel 130. However, in some implementations, the aircraft 100 includes at least one aerodynamic control surface movably coupled to the strut 120 at the strut inboard end portion 164 of the strut 120 primarily for other benefits. Extension of such an aerodynamic control surface can increase or decrease drag on the strut 120 and thus correspondingly increase or decrease lift generated by the strut 120. In other words, the movement of an aerodynamic control surface movably coupled to the strut 120 can change the camber of the strut 120 and thus change the lift characteristics of the strut 120. While the movement of an aerodynamic control surface at the strut outboard end portion 166 can also change the lift characteristics of the strut 120, the impact on the overall lift characteristics of the strut 120 is less than that attributed to the movement of an aerodynamic control surface at the strut inboard end portion 164.

In one embodiment, the at least one aerodynamic control surface movably coupled to each strut 120 at the strut inboard end portion 164 includes one or more of an inboard trailing aerodynamic control surface 182 and an inboard leading aerodynamic control surface 186. For example, in some implementations, the at least one aerodynamic control surface movably coupled to each strut 120 at the strut inboard end portion 164 includes only the inboard trailing aerodynamic control surface 182. In yet some implementations, the at least one aerodynamic control surface movably coupled to each strut 120 at the strut inboard end portion 164 includes both the inboard trailing aerodynamic control surface 182 and the inboard leading aerodynamic control surface 186.

The inboard trailing aerodynamic control surface 182 is movably coupled to the trailing edge 153 of the strut 120 at the strut inboard end portion 164 of the strut 120. The inboard trailing aerodynamic control surface 182 defines an aft part of the channel 178 near the body 104. The portion of the trailing edge 153 of the strut 120, to which the inboard trailing aerodynamic control surface 182 is movably coupled, can be inset from other portions of the trailing edge 153 of the strut 120. For example, the trailing edge 153 of the strut 120 may include a notch or pocket within which the inboard trailing aerodynamic control surface 182 is located in a retracted position. The notch defines the trailing edge 153 of the strut 120 at the location of the notch.

Referring to FIGS. 2 and 4, in some implementations, the inboard trailing aerodynamic control surface 182 extends from a fourth distance D4 away from the body 104 towards the wing-strut fairing 124. In yet other implementations, the inboard trailing aerodynamic control surface 182 extends from a distance, less than or greater than the fourth distance D4, away from the body 104 towards the wing-strut fairing 124. Referring to FIG. 2, in some implementations, the inboard trailing aerodynamic control surface 182 has a second length L2, which can be equal to, greater than, or less than the first length L1. In one implementation, the second length L2 is greater than the first length L1.

In contrast to the inboard trailing aerodynamic control surface 182, the inboard leading aerodynamic control surface 186 is movably coupled to the leading edge 155 of the strut 120 at the strut inboard end portion 164 of the strut 120. The inboard leading aerodynamic control surface 186 defines a forward part of the channel 178 near the body 104. The portion of the leading edge 155 of the strut 120, to which the inboard leading aerodynamic control surface 186 is movably coupled, can be inset from other portions of the leading edge 155 of the strut 120. For example, the leading edge 155 of the strut 120 may include a notch or pocket within which the inboard leading aerodynamic control surface 186 is located in a retracted position. The notch defines the leading edge 155 of the strut 120 at the location of the notch.

Referring to FIGS. 2 and 4, in some implementations, the inboard leading aerodynamic control surface 186 is located within the channel 178 and extends from the fourth distance D4 towards the wing-strut fairing 124. In yet other implementations, the inboard leading aerodynamic control surface 186 extends from a distance, less than or greater than the fourth distance D4, away from the body 104 towards the wing-strut fairing 124. Generally, in certain implementations, the inboard trailing aerodynamic control surface 182 is opposite the inboard leading aerodynamic control surface 186 in a chordwise direction along the strut 120. Referring to FIG. 2, in some implementations, the inboard leading aerodynamic control surface 186 has a fourth length L4, which can be equal to, greater than, or less than the third length L3. In one implementation, the fourth length L4 is greater than the third length L3.

Figure 5:
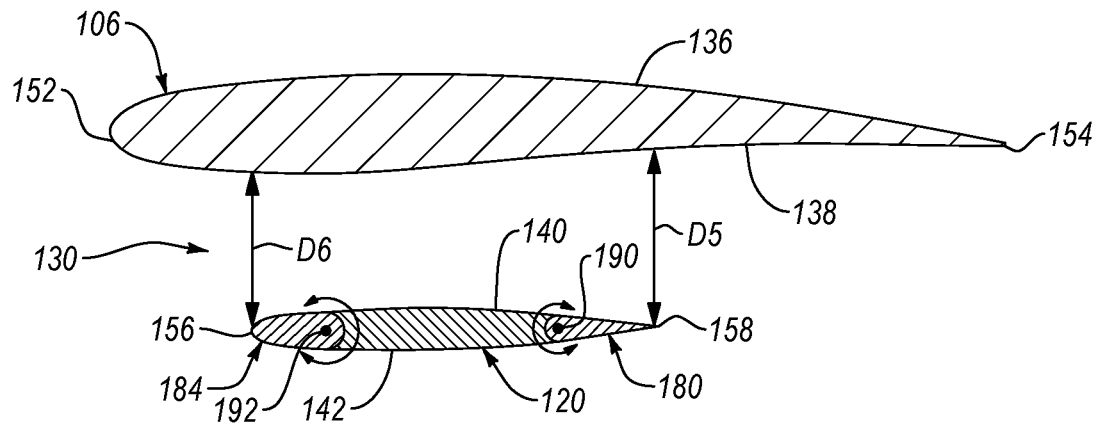
FIG. 5 is a cross-sectional side elevation view of the wing and the strut of the aircraft of FIG. 1, taken along the line A-A of FIG. 2, with aerodynamic control surfaces attached to the strut in retracted positions, according to one or more examples of the present disclosure.
Figure 6:
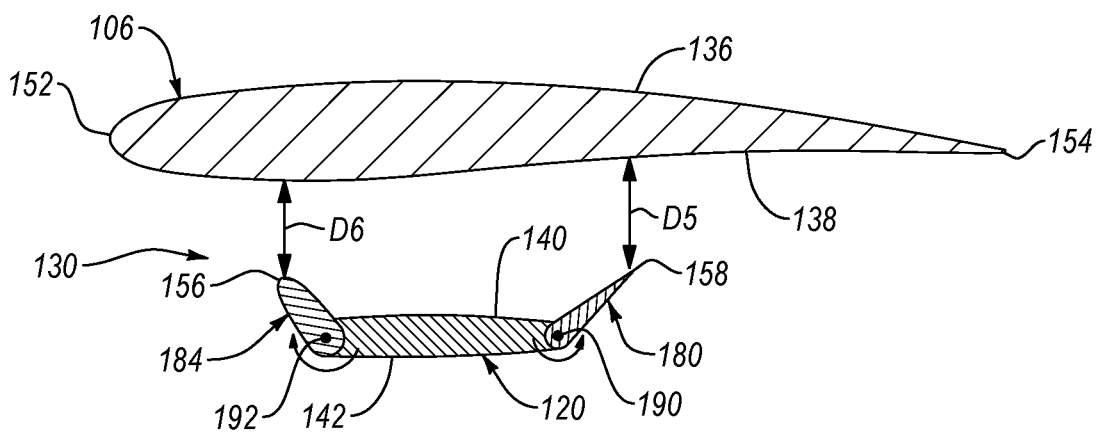
FIG. 6 is a cross-sectional side elevation view of the wing and the strut of the aircraft of FIG. 1, taken along the line A-A of FIG. 2, with aerodynamic control surfaces attached to the strut in extended positions toward the wing, according to one or more examples of the present disclosure.
Figure 7:
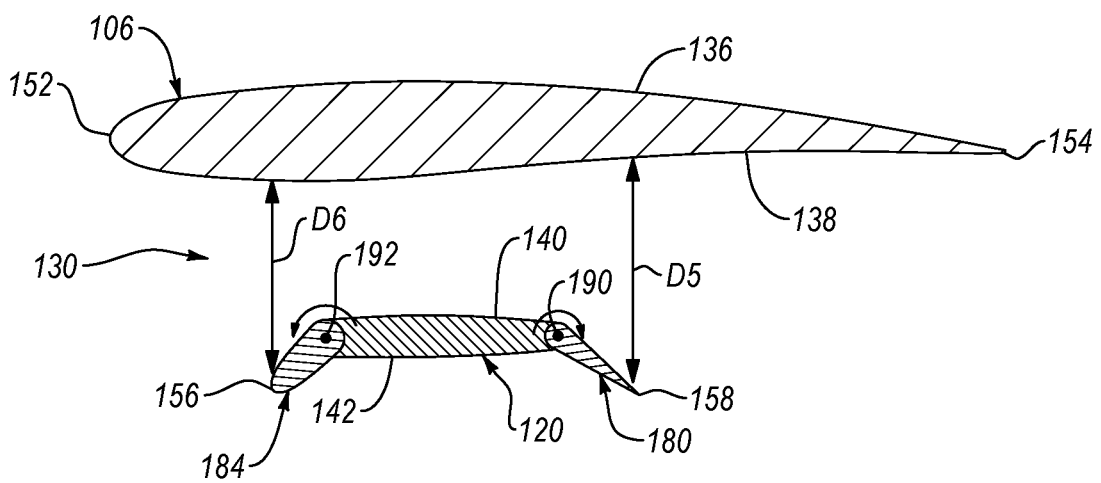
FIG. 7 is a cross-sectional side elevation view of the wing and the strut of the aircraft of FIG. 1, taken along the line A-A of FIG. 2, with aerodynamic control surfaces attached to the strut in extended away from the wing, according to one or more examples of the present disclosure.

Referring to FIGS. 5-7, in one embodiment, each of the outboard trailing aerodynamic control surface 180 and the outboard leading aerodynamic control surface 184 is a flap hingedly coupled to a corresponding one of the trailing edge 153 and the leading edge 155 of the strut 120.

In one implementation, the flap (e.g., trailing flap) of the outboard trailing aerodynamic control surface 180 has a profile that complements (e.g., matches) the profile of an aft part of the strut 120. For example, the trailing flap of the outboard trailing aerodynamic control surface 180 may converge rearwardly to a trailing edge 158. The trailing flap of the outboard trailing aerodynamic control surface 180 is configured to pivot about a first rotational axis 190 that is substantially parallel to the spanwise direction 148 in some implementations. The first rotational axis 190 can be defined by a pin or spindle fixed to the strut 120, such as via a mounting bracket.

In one implementation, the flap (e.g., leading flap) of the outboard leading aerodynamic control surface 184 has a profile that complements (e.g., matches) the profile of a forward part of the strut 120. For example, the leading flap of the outboard leading aerodynamic control surface 184 may converge forwardly to a leading edge 156. The leading flap of the outboard leading aerodynamic control surface 184 is configured to pivot about a second rotational axis 192 that is substantially parallel to the spanwise direction 148 in some implementations. Like the first rotational axis 190, the second rotational axis 192 can be defined by a pin or spindle fixed to the strut 120, such as via a mounting bracket.

In FIG. 5, the trailing and leading flaps of the outboard trailing aerodynamic control surface 180 and the outboard leading aerodynamic control surface 184 are in retracted positions. In the retracted positions, the trailing and leading flaps are within the loft profile of the strut 120. More specifically, when retracted, the trailing edge 158 of the trailing flap of the outboard trailing aerodynamic control surface 180 is aligned with the trailing edge 153 of the strut 120 adjacent the trailing flap and the leading edge 156 of the leading flap of the outboard leading aerodynamic control surface 184 is aligned with the leading edge 155 of the strut 120 adjacent the leading flap. Additionally, when retracted, the outer surface of the trailing flap of the outboard trailing aerodynamic control surface 180 is flush with the outer surface of the strut 120 adjacent the trailing flap and the outer surface of the leading flap of the outboard leading aerodynamic control surface 184 is flush with the outer surface of the strut 120 adjacent the leading flap.

Also shown, the trailing edge 158 of the trailing flap of the outboard trailing aerodynamic control surface 180 is separated from the bottom surface 138 of the wing 106 by a fifth distance D5 and the leading edge 156 of the leading flap of the outboard leading aerodynamic control surface 184 is separated from the bottom surface 138 of the wing 106 by a sixth distance D6. The sixth distance D6 defines the capture area of the wing-strut channel 130 and the fifth distance D5 indirectly affects the capture area of the wing-strut channel 130 by controlling the circulation of air flow around the strut 120. When the trailing flap of the outboard trailing aerodynamic control surface 180 and the leading flap of the of the outboard leading aerodynamic control surface 184 are retracted, the fifth distance D5 and the sixth distance D6 can be the same or different (e.g., the fifth distance D5 can be greater than the sixth distance D6).

Referring to FIG. 6, the trailing flap of the outboard trailing aerodynamic control surface 180 and the leading flap of the of the outboard leading aerodynamic control surface 184 are extended upward toward the wing 106 into an upward extended position. In particular, the trailing flap is moved (e.g., pivoted about the first rotational axis 190) toward the wing 106 and the leading flap is moved (e.g., pivoted about the second rotational axis 192) toward the wing 106. Movement of the trailing flap and the leading flap toward the wing 106 decreases the fifth distance D5 and the sixth distance D6 relative to the retracted position of FIG. 5. With the fifth distance D5 and the sixth distance D6 decreased, the amount of air flow allowed through the wing-strut channel 130 is reduced.

Referring to FIG. 7, the trailing flap of the outboard trailing aerodynamic control surface 180 and the leading flap of the of the outboard leading aerodynamic control surface 184 are extended downward away from the wing 106 into a downward extended position. In particular, the trailing flap is moved (e.g., pivoted about the first rotational axis 190) away from the wing 106 and the leading flap is moved (e.g., pivoted about the second rotational axis 192) away from the wing 106. Movement of the trailing flap and the leading flap away from the wing 106 increases the fifth distance D5 and the sixth distance D6 relative to the retracted position of FIG. 5. With the fifth distance D5 and the sixth distance D6 increased, the amount of air flow allowed through the wing-strut channel 130 is increased. Such an increase in the amount of air flow can result in an increase in the lift generated by the strut 120 at the location of the flaps. Accordingly, in some implementations, downward deflection of the flaps of the strut 120 may be more applicable to locations along the strut 120 where the distance between the strut 120 and the wing 106 is larger, such as at locations at or closer to the strut inboard end portion 164 (e.g., locations associated with the inboard trailing aerodynamic control surface 182 and the inboard leading aerodynamic control surface 186).

Although FIGS. 6 and 7 show both the trailing flap of the outboard trailing aerodynamic control surface 180 and the leading flap of the of the outboard leading aerodynamic control surface 184 extended upwardly and downwardly, respectively, in some implementations, the trailing flap and the leading flap can be extended independently of each other. For example, one of the trailing flap and the leading flap can be extended, upwardly or downwardly, while the other one of the trailing flap and the leading flap remains retracted. Additionally, as another example, one of the trailing flap and the leading flap can be extended upwardly while the other one of the trailing flap and the leading flap is extended downwardly.

Furthermore, although FIGS. 6 and 7 and the corresponding description are specifically directed to the trailing flap and the leading flap of the outboard trailing aerodynamic control surface 180 and the outboard leading aerodynamic control surface 184, respectively, the same figures and description are applicable to the trailing flap and the leading flap of the inboard trailing aerodynamic control surface 182 and the inboard leading aerodynamic control surface 186, respectively. In other words, movement of the trailing flap and the leading flap of the outboard trailing aerodynamic control surface 180 and the outboard leading aerodynamic control surface 184, respectively, toward and away from the wing 106 can be the same as or analogous to the movement of the trailing flap and the leading flap of the inboard trailing aerodynamic control surface 182 and the inboard leading aerodynamic control surface 186, respectively, described above. Moreover, the trailing flap and the leading flap the inboard trailing aerodynamic control surface 182 and the inboard leading aerodynamic control surface 186, respectively, can be extended independently of each other and independently of the trailing flap and the leading flap the outboard trailing aerodynamic control surface 180 and the outboard leading aerodynamic control surface 184.

As presented above, it is noted that the configurations shown in FIGS. 5-7, with hinged flaps on the leading and trailing edges of the strut 120, are one implementation. In other implementations, only the trailing edge of the strut 120 has an aerodynamic control surface such that the leading edge of the strut 120 does not have aerodynamic control surfaces. According to yet alternative implementations, only the leading edge of the strut 120 has an aerodynamic control surface such that the trailing edge of the strut 120 does not have aerodynamic control surfaces.

Although the outboard trailing aerodynamic control surface 180 and the outboard leading aerodynamic control surface 184 are shown as hinged flaps in FIGS. 5-7, in other embodiments, the outboard trailing aerodynamic control surface 180 and the outboard leading aerodynamic control surface 184, as well as the inboard trailing aerodynamic control surface 182 and the inboard leading aerodynamic control surface 186, can be other types of flaps or other types of aerodynamic control surfaces and be movable in motions other than a simple hinged rotational motion. In some implementations, one or more of the aerodynamic control surfaces can be a flap configured to move translationally as well as pivotally. For example, one or more of the aerodynamic control surfaces can be a flap that, similar to the flap of a wing, translationally moves in a Fowler motion. In yet some implementations, one or more of the aerodynamic control surfaces can be a split flap where just one of the upper or lower surfaces of the split flap is actuatable. According to other implementations, the one or more of the aerodynamic control surfaces can be a morphing surface, such as disclosed in U.S. Pat. No. 9,598,176, issued Mar. 21, 2017, and U.S. Pat. No. 9,415,856, issued Aug. 16, 2016, which are incorporated herein by reference in their entirety. In certain other implementations, one or more of the aerodynamic control surfaces can be a Gurney flap. In general, the aerodynamic control surfaces can be any of various features configured to adjust the circulation of air flow around the strut 120 or through the channel 178 between the strut 120 and the wing 106 and/or adjust the area of the channel 178 or the distance between the strut 120 and the wing 106.

The aircraft 100 can additional or alternatively include one or more aerodynamic control surfaces movably coupled to the strut 120 at an intermediate location or intermediate locations between the strut inboard end portion 164 and the strut outboard end portion 166. For example, in the illustrated embodiment of FIG. 4, the aircraft 100 may include an additional aerodynamic control surface 177 movably coupled to the trailing edge 153 of the strut 120 and/or an additional aerodynamic control surface 179 movably coupled to the leading edge 155 of the strut 120 at locations between the strut inboard end portion 164 and the strut outboard end portion 166.

The body 104, wing 106, strut 120, and/or aerodynamic control surfaces 180-186 can be made from a fiber-reinforced polymer (e.g., carbon-fiber-reinforced polymer and glass-fiber-reinforced polymer), a metal, or a combination of a fiber-reinforced polymer and metal in some implementations.

Figure 8:
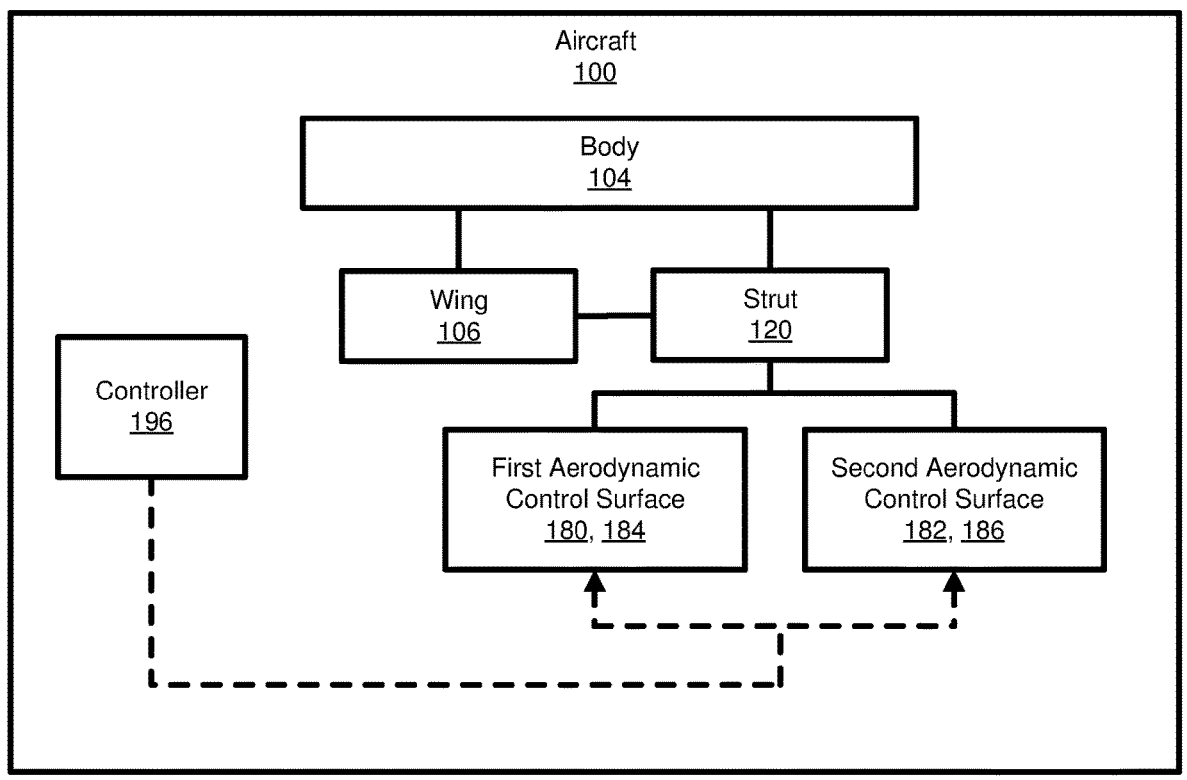
FIG. 8 is a schematic block diagram of an aircraft, according to one or more examples of the present disclosure.

Referring to FIG. 8, according to one embodiment, the aircraft 100 further includes a controller 196 (e.g., electronic controller). The controller 196 is configured to selectively control movement of one or more aerodynamic control surfaces movably coupled to the strut 120. In the illustrated implementation, the controller 196 is configured to selectively control movement of the first aerodynamic control surface 180 and the second aerodynamic control surface 182 relative to the strut 120. The controller 196 selectively controls movement of the first aerodynamic control surface 180 and the second aerodynamic control surface 182 differently or the same.

In certain implementations, the controller 196 selectively controls movement of the first aerodynamic control surface 180 and the second aerodynamic control surface 182 differently based on a speed of the aircraft 100. For example, when the aircraft 100 is traveling at transonic speeds, the controller 196 can be configured to move the first aerodynamic control surface 180 toward the wing 106 and to maintain the second aerodynamic control surface 182 in a retracted position. Such as configuration of the first aerodynamic control surface 180 and the second aerodynamic control surface 182 helps to reduce the strength of shockwaves within the wing-strut channel 130 without adding drag near the body 104 where such drag is unwanted at high speeds. In contrast, as another example, when the aircraft 100 is traveling at slower speeds, such as landing and take-off speeds, the controller 196 is configured to maintain the first aerodynamic control surface 180 in a retracted position and to move the second aerodynamic control surface 182 toward or away from the wing 106. Such as configuration of the first aerodynamic control surface 180 and the second aerodynamic control surface 182 helps to add lift, when desired, to aid in take-off and landing maneuvers without significantly increasing the acoustic signature of the aircraft 100 or to dump lift, when desired, to compensate for too much lift generated by the wings 106 during landing or ground effects induced during landing. In other implementations, the controller 196 selectively controls movement of the aerodynamic control surfaces movably coupled to the strut 120 to provide gust load alleviation on the strut 120, to facilitate drag reduction at transonic speeds by actively tailoring spanload, and/or to supplement the nominal aerodynamic control surfaces of the wings 106 for improved directly and longitudinal stability.

It is recognized that in some implementations the controller 196 can also be configured to selectively control movement of any of various other aerodynamic control surfaces in a similar manner. For example, in one implementation, the controller 196 is configured to selectively control movement of the aerodynamic control surface 184 in a similar manner as the first aerodynamic control surface 180 and/or selectively control movement of the aerodynamic control surface 186 in a similar manner as the second aerodynamic control surface 182.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The electronic controller described in this specification may be implemented as a hardware circuit comprising custom VLSI circuits or gate arrays, off-the-shelf semiconductors such as logic chips, transistors, or other discrete components. The electronic controller may also be implemented in programmable hardware devices such as field programmable gate arrays, programmable array logic, programmable logic devices or the like.

The electronic controller may also be implemented in code and/or software for execution by various types of processors. An identified module of code may, for instance, comprise one or more physical or logical blocks of executable code which may, for instance, be organized as an object, procedure, or function. Nevertheless, the executables of the electronic controller need not be physically located together, but may comprise disparate instructions stored in different locations which, when joined logically together, comprise the electronic controller and achieve the stated purpose for the electronic controller.

Indeed, code of the electronic controller may be a single instruction, or many instructions, and may even be distributed over several different code segments, among different programs, and across several memory devices. Similarly, operational data may be identified and illustrated herein within the electronic controller, and may be embodied in any suitable form and organized within any suitable type of data structure. The operational data may be collected as a single data set, or may be distributed over different locations including over different computer readable storage devices. Where the electronic controller or portions of the electronic controller are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. An aircraft, comprising:
   a body;
   a wing, coupled to and extending from the body, the wing comprising a wing inboard end portion, a wing outboard end portion, opposite the wing inboard end portion, and an intermediate portion between the wing inboard end portion and the wing outboard end portion;
   a strut, positioned below the wing and comprising:
      a strut inboard end portion coupled to and extending from the body; and
      a strut outboard end portion coupled to and extending from the intermediate portion of the wing; and
   at least one aerodynamic control surface movably coupled to the strut at the strut outboard end portion, wherein the at least one aerodynamic control surface is selectively movable relative to the strut between a retracted position, in which the at least one aerodynamic control surface is within a loft profile of the strut, an upward extended position, in which the at least one aerodynamic control surface is closer to the wing than when in the retracted position, and a downward extended position, in which the at least one aerodynamic control surface is further away from the wing than when in the retracted position.

2. The aircraft according to claim 1, wherein the at least one aerodynamic control surface is selectively movable relative to the strut to adjust a distance between the at least one aerodynamic control surface and the wing.

3. The aircraft according to claim 2, wherein the at least one aerodynamic control surface is selectively movable toward the wing to decrease the distance between the at least one aerodynamic control surface and the wing.

4. The aircraft according to claim 2, wherein the at least one aerodynamic control surface is selectively movable away from the wing to increase the distance between the at least one aerodynamic control surface and the wing.

5. The aircraft according to claim 1, wherein:
   the strut comprises a trailing edge; and
   the at least one aerodynamic control surface is coupled to the trailing edge of the strut.

6. The aircraft according to claim 1, wherein:
   the strut comprises a leading edge; and
   the at least one aerodynamic control surface is coupled to the leading edge of the strut.

7. The aircraft according to claim 1, wherein:
   the strut comprises a leading edge and a trailing edge; and
   the aircraft comprises a plurality of aerodynamic control surfaces.

8. The aircraft according to claim 7, wherein:
   at least one of the plurality of aerodynamic control surfaces is movably coupled to the leading edge of the strut; and
   at least one of the plurality of aerodynamic control surfaces is movably coupled to the trailing edge of the strut.

9. The aircraft according to claim 7, wherein
   at least one of the plurality of aerodynamic control surfaces is movably coupled to the strut inboard end portion of the strut.

10. The aircraft according to claim 1, wherein the at least one aerodynamic control surface is movably coupled to the strut outboard end portion of the strut.

11. The aircraft according to claim 1, wherein the at least one aerodynamic control surface is movably coupled to the strut inboard end portion of the strut.

12. The aircraft according to claim 1, wherein the at least one aerodynamic control surface comprises a flap hingedly coupled to the strut.

13. The aircraft according to claim 1, wherein:
   the strut comprises a leading edge and a trailing edge;
   the at least one aerodynamic control surface comprises a leading edge and a trailing edge;
   in the retracted position the trailing edge of the at least one aerodynamic control surface is aligned with the trailing edge of the strut; and
   in the upward extended position and the downward extended position the trailing edge of the at least one aerodynamic control surface is vertically offset from the trailing edge of the strut.

14. The aircraft according to claim 1, wherein:
   the strut comprises a leading edge and a trailing edge;
   the at least one aerodynamic control surface comprises a leading edge and a trailing edge;
   in the retracted position the leading edge of the at least one aerodynamic control surface is aligned with the leading edge of the strut; and
   in the upward extended position and the downward extended position the leading edge of the at least one aerodynamic control surface is vertically offset from the leading edge of the strut.

15. The aircraft according to claim 1, wherein:
   in the retracted position the at least one aerodynamic control surface is flush with the strut; and
   in the upward extended position and the downward extended position the at least one aerodynamic control surface is not flush with the strut.

16. The aircraft according to claim 1, wherein the wing has a span-to-chord ratio of at least 18:1.

17. The aircraft according to claim 1, wherein the aircraft is configured for travel at transonic speeds.

18. An aircraft, comprising:
a body;
a wing, coupled to and extending from the body, the wing comprising a wing inboard end portion, a wing outboard end portion, opposite the wing inboard end portion, and an intermediate portion between the wing inboard end portion and the wing outboard end portion;
a strut, positioned below the wing and comprising:
- a strut inboard end portion coupled to and extending from the body; and
- a strut outboard end portion coupled to and extending from the intermediate portion of the wing;

a first aerodynamic control surface movably coupled to the strut at the strut outboard end portion, wherein the first aerodynamic control surface is selectively movable relative to the strut between a first retracted position, in which the first aerodynamic control surface is within a loft profile of the strut, a first upward extended position, in which the first aerodynamic control surface is closer to the wing than when in the first retracted position, and a first downward extended position, in which the first aerodynamic control surface is further away from the wing than when in the first retracted position;
a second aerodynamic control surface movably coupled to the strut at the strut inboard end portion, wherein the second aerodynamic control surface is selectively movable relative to the strut between a second retracted position, in which the second aerodynamic control surface is within a loft profile of the strut, a second upward extended position, in which the second aerodynamic control surface is closer to the wing than when in the second retracted position, and a second downward extended position, in which the second aerodynamic control surface is further away from the wing than when in the second retracted position; and
a controller configured to selectively control movement of the first aerodynamic control surface and the second aerodynamic control surface relative to the strut.

19. The aircraft according to claim 18, wherein at transonic speeds of the aircraft the controller moves the first aerodynamic control surface into the first upward extended position, maintains the first aerodynamic control surface in the first upward extended position, and maintains the second aerodynamic control surface in the second retracted position.

20. The aircraft according to claim 18, wherein at landing and take-off speeds of the aircraft the controller maintains the first aerodynamic control surface in the first retracted position and moves the second aerodynamic control surface toward or away from the wing.

* * * * *